UNITED STATES PATENT OFFICE.

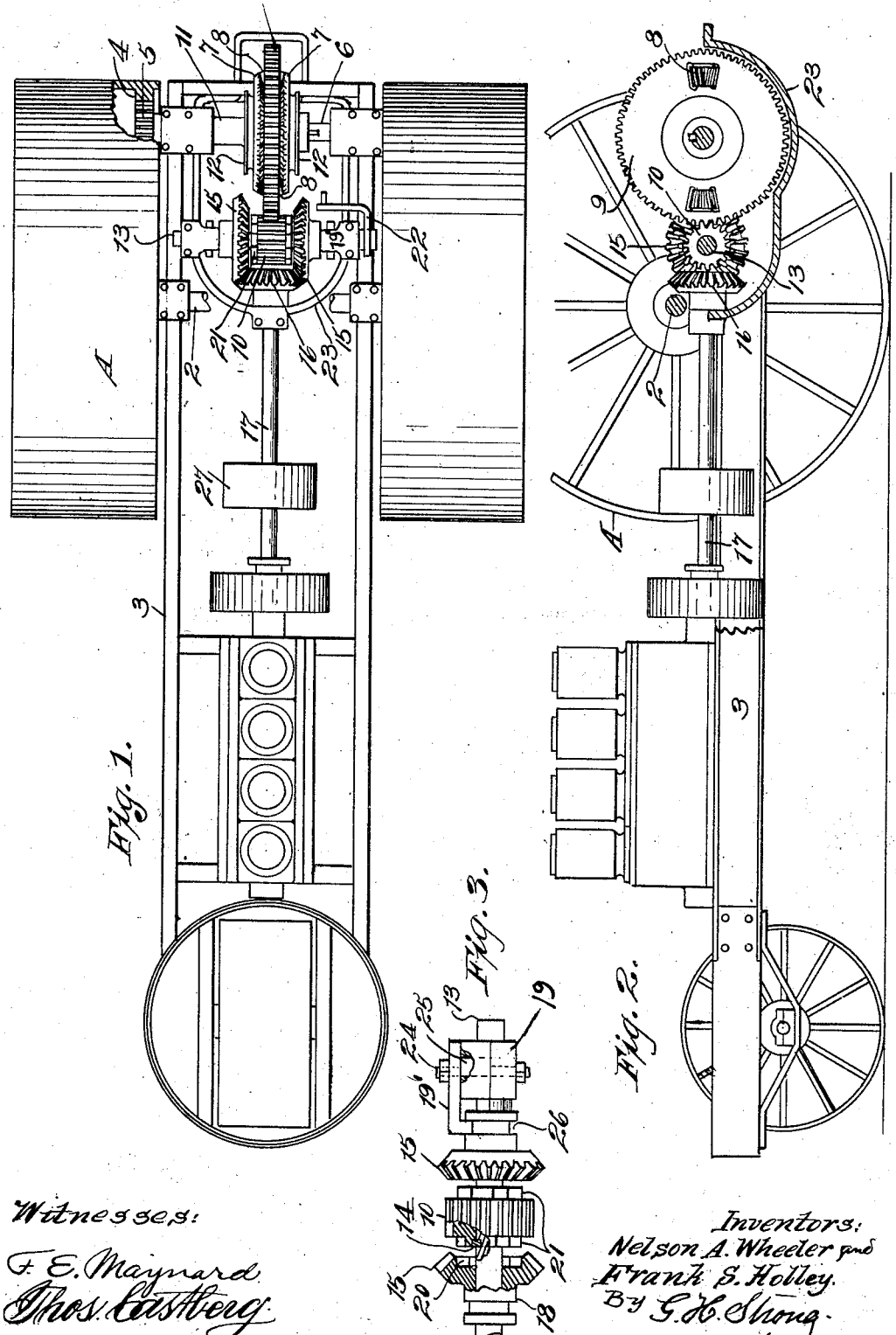

NELSON A. WHEELER AND FRANK S. HOLLEY, OF STOCKTON, CALIFORNIA.

TRANSMISSION MECHANISM.

1,049,628.  Specification of Letters Patent.  Patented Jan. 7, 1913.

Application filed March 14, 1912. Serial No. 683,729.

*To all whom it may concern:*

Be it known that we, NELSON A. WHEELER and FRANK S. HOLLEY, both citizens of the United States, residing at Stockton, in the county of San Joaquin and State of California, have invented new and useful Improvements in Transmission Mechanism, of which the following is a specification.

Our invention relates to transmission mechanism for vehicles which is especially adapted for traction engines, automobiles and vehicles which are impelled by a motor carried by the vehicle itself.

The object of this invention is to increase the flexibility of the transmission mechanism and enable the direction of a traveling traction machine to be reversed, to dispose the mechanism to drive in one direction only, or to enable the power to be used independently.

Having reference to the accompanying drawings Figure 1 is a plan view in partial section. Fig. 2 is a side elevation. Fig. 3 is a sectional detail of the shifting shaft.

We have shown our apparatus here as mounted upon driving and bearing wheels A, having a shaft 2 journaled upon a main frame 3. The shaft may be fixed, and the wheels may be turnable upon the ends of the shaft upon which they are mounted for that purpose. The driving of these wheels may be effected by means of internal gears 4 fixed within the rims of the wheels and pinions 5 which engage the internal gears. These pinions are mounted upon a shaft 6, and centrally between the sides of the machine are fixed the beveled gears 7, which are so disposed as to be engaged by the pinions 8 of an equalizing or differential gearing; this gearing being of the construction well known in the art. These pinions 8 are mounted in a gear wheel 9 to which power is applied from a pinion 10. When this gear wheel 9 is driven, it will act through the pinions 8 to drive both the gears 7 and the parts to which they are attached. One of these gears is mounted directly upon the shaft 6 and the other upon a sleeve 11 which is turnable upon the shaft 6. The shaft 6 is thus made complete and undivided, extending entirely through from side to side and thus giving the full strength to the shaft which would not be possible in case the two-part shafts were used.

For convenience in operation we have shown upon the back of each gear a grooved member 12, which may receive a properly constructed brake strap, so that either shaft 6 or sleeve 11 may be acted upon by its brake to stop or cause it to run slower, as may be desired.

The pinion 10 is turnably mounted upon a shaft 13 which is journaled across the frame 3 but is retained in its position upon the shaft by means of collars 14 which prevent its slipping endwise upon the shaft but allow the pinion to turn freely upon the shaft. Upon each side of this pinion 10 are located beveled gears 15, and these gears are held in engagement with a pinion 16 which is mounted upon the driving shaft 17; this shaft extending longitudinally between the side bars of the frame and being connected with any suitable motor.

The gears 15 are each loose upon shaft 13 so that they may not only turn independently of the shaft, but shaft 13 may slide freely through them; the gears 15 being held in proper position by suitable means as the flanged caps 19' bolted to the boxes 19, in which latter, shaft 13 is slidable. No power is transmitted directly through shaft 13; all the gears upon it being loose gears. It forms simply a support for said gears, and a shifting means for the central gear 10, which carries clutch members 21 at each end adapted to engage, accordingly as shaft 13 is shifted, with corresponding clutch members 20 on the adjacent faces of the opposed beveled gears 15. Inasmuch as gear 16 on the drive shaft 17 is normally in constant mesh with the opposed beveled gears 15, the latter gears run in opposite directions on the same shaft to drive gear-wheel 9, and with it the machine. Pinion 10 is shifted endwise to engage one of the gears 15; and to reverse the machine, pinion 10 is moved in the opposite direction to engage the other gear 15; the gear face of pinion 10 being sufficiently wide to retain it always in mesh with the gear wheel 9. If it is desired to engage either of the gears 15 with the pinion 10, the shaft 13, upon which the gears 15 are mounted, may be moved in one direction or the other, and it will slide in the boxes 19 against which the hubs of the pinion abut. This movement may be effected by means of a lever, as at 22, so disposed and located as to be readily operated in any suitable or desirable manner. Thus if the shaft is pushed in one direction it will carry the pinion 10 toward the opposite gear 14 until the clutch members 20 and 21 upon that side are engaged. If it be moved in the opposite direction the first named clutch members will be disengaged and the clutch members 20 and 21 upon the opposite side will be engaged with the other gear. Thus the apparatus may be reversed at will. The whole of this mechanism is suitably inclosed in a casing, as 23, and the boxes 19 are carried upon this casing.

This construction is suitable for an apparatus of any description where it is desired to reverse the direction of travel, and when it is used in connection with a traveling traction or other machine, the power transmitted through the pinion 10, the gear 9, the differential pinions, and the shaft 6, and sleeve 11, will be transmitted from these parts respectively through the gears 5 to the driving gears 4 of the wheels, and as long as the machine is moving in a direct line, power will be transmitted equally to both wheels. If the machine is caused to turn to either one side or the other, the differential gearing will act in the manner usual to such gearing.

In cases where it is desirable to drive in one direction only the following adjustment may be had: The bolts 24 which secure boxes 19 and caps 19' in place have eccentric projections 25 upon one side, Fig. 3, by which a respective gear 15 may be shifted lengthwise on the supporting shaft 13, according as it may be desired to lock the gear 15 in position, so that the corresponding clutch members 20—21 may engage; or to remove gear 15 out of possible engagement with said clutch members. If it is desired to permanently disengage one of the gear wheels 15 from its driving pinion 16 it is only necessary to remove the bolts 24 and turn them around, thus moving the cap and box backward and with it the gear 15 to which its cap is connected by a tongue or projection which engages a groove 26 in the hub. The cap being then again secured in place, the engagement between the projecting tongue and the groove 26 in the hub will insure the retention of the gear 15 out of engagement with the pinion 16. The driving will then take place only over the opposite side.

If it is desired to use the power independent of the traction portion of the apparatus, both the gears 15 may be disengaged from the pinion 16. The power may then be transmitted for any other purpose by means of a pulley 27.

An important feature of our invention lies in the floating shaft 13, both turnable and slidable endwise in its bearing boxes, and the pinion is also turnable freely upon this shaft between collars which insure its movement in unison with the endwise movement of the shaft.

In case there is any temporary undue friction in any part the other part may still move freely.

Having thus described our invention, what we claim and desire to secure by Letters Patent is—

1. In a transmission mechanism, the combination of a drive shaft and a beveled gear carried thereby, a transversely disposed idle shaft, two loose, opposed beveled gears on the idle shaft in constant mesh with said beveled gear on the drive shaft, said idle shaft being freely movable lengthwise through said gears thereon, means for holding the gears on the idle shaft in desired position, an intermediate pinion on the idle shaft turning free thereon and shiftable lengthwise therewith, said intermediate pinion and beveled gears on the idle shaft having clutch members whereby the pinion is coupled to one of said gears when the pinion is shifted in one direction, and is coupled to the other gear when shifted in the opposite direction, and a gear wheel meshing said intermediate pinion.

2. In a transmission mechanism, the combination of a shaft, a pair of beveled gears loosely mounted thereon through which the shaft is slidable, a beveled pinion meshing with each of said beveled gears to drive the latter in opposite directions, a pinion turning free on said shaft, but movable lengthwise therewith and disposed intermediate of the beveled gears thereon, coupling means on the adjacent ends of the intermediate pinion and beveled gears, means for shifting the shaft lengthwise to couple the intermediate pinion with one of the said beveled gears and correspondingly uncouple it from the other, and a driving gear in constant mesh with the intermediate pinion.

3. In a transmission mechanism, the combination of a floating shaft, bearings in which said shaft is mounted for endwise movement, a pair of opposed, loose beveled gears on the shaft, said gears having grooved hubs, flanged caps fitting said grooves to hold the beveled gears in proper spaced position, a driving shaft having a beveled gear meshing the first-named beveled gears, an intermediate pinion on the floating shaft, said pinion turnable thereon, and the shaft having collars engaging the pinion to cause the pinion to shift endwise in unison with the shaft, coupling means on the adjacent ends of the pinion and first-named beveled gears, a driven gear meshing with the pinion, and means for shifting the floating shaft endwise in either direction correspondingly to revolve the driven gear in one direction or the other.

4. In a transmission mechanism, the combination of a floating shaft, boxes in which the shaft is slidable, a pinion turnable loose on and movable longitudinally with the shaft, loose beveled gears located upon each side of the pinion and through which the shaft may shift endwise, coupling means carried by the ends of the pinion and by the beveled gears, a driving shaft and a beveled pinion engageable with the beveled gears, said boxes having caps provided with flanges engaging with grooves in the hubs of the beveled gears, bolts passing through the caps and having eccentric extensions, said bolts reversible to move and hold the caps endwise of the floating shaft whereby one or both of said beveled gears may be held in operative position, or in inoperative position, for engagement with said intermediate pinion.

In testimony whereof we have hereunto set our hands in the presence of two subscribing witnesses.

NELSON A. WHEELER.
FRANK S. HOLLEY.

Witnesses:
JOHN H. HERRING,
F. E. MAYNARD.